(12) United States Patent
Nogami et al.

(10) Patent No.: US 8,960,359 B2
(45) Date of Patent: Feb. 24, 2015

(54) WORK VEHICLE WITH DIESEL PARTICULATE FILTER

(75) Inventors: Kazuaki Nogami, Sakai (JP); Hironori Tsuchihashi, Wakayama (JP); Takahiro Shiraga, Sakai (JP); Eiji Sato, Sakai (JP); Akira Minoura, Osaka (JP); Takafumi Komatsu, Izumi (JP)

(73) Assignee: Kubota Corporation, Osaka (JP)

( * ) Notice: Subject to any disclaimer, the term of this patent is extended or adjusted under 35 U.S.C. 154(b) by 193 days.

(21) Appl. No.: 13/562,557

(22) Filed: Jul. 31, 2012

(65) Prior Publication Data

US 2013/0256054 A1 Oct. 3, 2013

(30) Foreign Application Priority Data

Mar. 30, 2012 (JP) .................................. 2012-81050

(51) Int. Cl.
*B60K 13/00* (2006.01)
*B60K 11/06* (2006.01)

(52) U.S. Cl.
CPC .................. *B60K 13/00* (2013.01); *B60K 11/06* (2013.01)
USPC ........ 180/309; 180/68.1; 180/68.2; 180/68.4; 180/68.6; 180/296

(58) Field of Classification Search
None
See application file for complete search history.

(56) References Cited

U.S. PATENT DOCUMENTS

| 2008/0179130 A1* | 7/2008 | Larson .......................... 180/309 |
| 2011/0011665 A1* | 1/2011 | Peterson et al. .............. 180/309 |

FOREIGN PATENT DOCUMENTS

| JP | 06-292401 | 10/1994 |
| JP | 07-119460 | 5/1995 |
| JP | 07-277012 | 10/1995 |
| JP | 2003-063259 | 3/2003 |
| JP | 2007-062506 | 3/2007 |
| JP | 2012-026326 | 7/2010 |
| JP | 2012-026326 | 2/2012 |

* cited by examiner

*Primary Examiner* — J. Allen Shriver, II
*Assistant Examiner* — Hilary L Johns
(74) *Attorney, Agent, or Firm* — Greenblum & Bernstein, P.L.C.

(57) ABSTRACT

A work vehicle includes a cooling fan, an engine, and a diesel particulate filter (DPF) purifying exhaust gas of the engine, placed under a hood in that order, beginning at the front. Exhaust gas from the engine is exhausted through an exhaust passage after passing through the DPF. The cooling fan supplies cooling air to the rear. The DPF is placed such that a length direction thereof follows a width direction of a vehicle body. The exhaust passage includes a first passage, a second passage, and a third passage. The first passage extends forward and upward from the DPF before extending along the length direction thereof on a front side of the DPF. The second passage extends downward from a downstream portion of the first passage. The third passage extends to the rear from a downstream portion of the second passage and also includes an exhaust outlet.

16 Claims, 4 Drawing Sheets

WORK VEHICLE WITH DIESEL PARTICULATE FILTER

CROSS-REFERENCE TO RELATED APPLICATIONS

The present application claims priority under 35 U.S.C. §119 of Japanese Application No. 2012-081050, filed on Mar. 30, 2012, the disclosure of which is expressly incorporated by reference herein in its entirety.

BACKGROUND OF THE INVENTION

1. Field of the Invention

The present invention relates to a work vehicle having a configuration where exhaust gas from an engine is exhausted through an exhaust passage extending from a diesel particulate filter (DPF) after passing through the DPF.

2. Description of Related Art

A work vehicle includes a diesel engine (simply referred to as an engine hereafter). The work vehicle is configured such that exhaust gas from the engine is purified by passing through a DPF and, after being purified, the exhaust gas is exhausted through an exhaust passage extending from the DPF. For example, the riding-type mower of Related Art 1 is configured such that an exhaust outlet extends to the rear as an exhaust passage from a rear portion of the DPF provided to a rear end of a vehicle body and the exhaust gas is exhausted to the rear.

Related Art 1: Japanese Patent Laid-open Publication No. 2012-26326

SUMMARY OF THE INVENTION

Immediately after being exhausted from a DPF, exhaust gas may have an extremely high temperature of approximately 600° C. Therefore, cooling must be effectively performed in the time before the exhaust gas is finally exhausted from an exhaust outlet of an exhaust pipe. The present invention is conceived in light of this circumstance and provides a work vehicle capable of effectively cooling the exhaust gas from the DPF within an exhaust passage.

The work vehicle according to the present invention includes a hood provided to a rear portion of a vehicle body, and under the hood includes a cooling fan, an engine, and a DPF purifying exhaust gas from the engine. The work vehicle is configured such that exhaust gas from the engine is exhausted through an exhaust passage extending from the DPF after passing through the DPF. The cooling fan, the engine, and the DPF are placed under the hood in that order from a front direction in a front-back direction of the vehicle body. The cooling fan is placed so as to supply cooling air to the rear while the DPF is placed such that a length direction thereof follows a width direction of the vehicle body. The exhaust passage is configured to include a first passage, a second passage, and a third passage. The first passage extends forward and upward from the DPF before extending along the length direction thereof on a front side of the DPF. The second passage extends downward from a downstream portion of the first passage. The third passage extends to the rear from a downstream portion of the second passage and also includes an exhaust outlet.

In a configuration according to the present invention, cooling air from the cooling fan passes between the engine and the hood and is directed to the rear. By configuring the exhaust passage as described above, the exhaust passage curves in an area where the cooling air from the cooling fan flows, thus ensuring a length of the exhaust passage in this area to be long. In particular, the exhaust passage extends forward and upward from the DPF before extending along the length direction thereof on the front side of the DPF. Thereby, the exhaust passage projects upward a certain amount past the top end of the engine and, in this state, extends along the length direction of the DPF. In particular, the length of the exhaust passage can be ensured to be long in a space between the engine and the hood where the cooling air flows easily.

The front side of the DPF where the first passage extends is a position separated from the DPF, which is a source of heat, and also a position close to the cooling fan. The cooling air thus easily contacts the first passage. Accordingly, the exhaust gas passing through the first passage can be efficiently cooled by the cooling air.

In the present invention, the exhaust passage also includes a second passage extending downward from a downstream portion of the first passage. Specifically, the second passage extends downward in a space between the side of the engine and the hood, which is a space where the cooling air is easily supplied. Accordingly, the exhaust gas which passes through the second passage after being cooled in the first passage can be further and continuously cooled by the cooling air in that time.

As a result, the exhaust gas exhausted from the DPF is effectively cooled in the exhaust passage and the temperature of the exhaust gas can be effectively reduced.

The work vehicle of the present invention is preferably configured as described below. A portion extending along a length direction of the first passage is positioned further to the rear further downstream.

According to the above configuration, a route of the first passage is longer compared to a case where the first passage simply extends sideways along the length direction. Therefore, the exhaust gas passing through the first passage can be continuously cooled for a longer duration in that space. Accordingly, the work vehicle of the present invention having the configuration described above enables the temperature of the exhaust gas exhausted from the exhaust passage to be further reduced.

The work vehicle of the present invention is preferably configured as described below. The second passage is positioned further forward the lower a portion of the second passage is.

According to the above configuration, a route of the second passage is longer compared to a case where the second passage simply extends downward. Therefore, the exhaust gas passing through the second passage can be continuously cooled for an even longer duration. In addition, according to the above configuration, the second passage is close to the cooling fan. Thus, the cooling air more easily contacts the second passage and the exhaust gas passing through the second passage can be more efficiently cooled. Accordingly, the work vehicle of the present invention having the configuration described above enables the temperature of the exhaust gas exhausted from the exhaust passage to be further reduced.

The work vehicle of the present invention is preferably configured as described below. The exhaust passage has a plurality of connected pipe-like members. The pipe-like members have a larger diameter further downstream. At a portion connecting the pipe-like members with each other, which is positioned at a portion extending along the length direction of the first passage, a terminal end portion of an upstream pipe-like member is inserted into an introductory end portion of a next downstream pipe-like member in a state where a gap exists in a diameter direction. In addition, a plate member formed along a rear portion in a circumferential direction of the introductory end portion is provided to a rear side of the downstream pipe-like member, extending from the rear portion in the circumferential direction of the introductory end portion along the first passage.

According to the above configuration, the gap in the diameter direction on the portion connecting the pipe-like members with each other, which is positioned at a portion extending along the length direction of the first passage, opens to face the upstream side of the first passage. Specifically, in the portion connecting the pipe-like members with each other, which is positioned at a portion extending along the length direction of the first passage, the cooling air supplied to the area around the connecting portion is sucked into the gap by an ejector effect generated by the exhaust gas flowing out from the terminal end portion of the upstream pipe-like member to an interior of the downstream pipe-like member. The cooling air also flows into the interior of the downstream pipe-like member. In other words, the cooling air is pulled into the exhaust passage.

The cooling fan directs the cooling air to the rear. By contacting the inner surface of the plate member provided to the connecting portion, the direction of the cooling air is changed so as to be directed downstream of the first passage while following the inner surface of the plate member. Specifically, the cooling air is guided to the gap by the plate member and flows into the interior of the downstream pipe-like member. Accordingly, the cooling air is pulled into the exhaust passage.

As described above, the cooling air is pulled into the exhaust passage at the first passage due to the ejector effect and the plate member, thus enabling the temperature of the exhaust gas exhausted from the exhaust passage to be further reduced.

The work vehicle of the present invention is preferably configured as described below. The cross-sectional surface area of the passage at the terminal end portion of the upstream pipe-like member is smaller than the cross-sectional surface area of the passage further upstream.

According to the above configuration, in the portion connecting the pipe-like members with each other, which is positioned at a portion extending along the length direction of the first passage, a speed of the exhaust gas flowing out from the terminal end portion of the upstream pipe-like member is faster than the speed of the exhaust gas further upstream. Specifically, compared to a case where the cross-sectional surface area of the passage at the terminal end portion of the upstream pipe-like member does not have the above-described configuration, the exhaust gas can be made to flow energetically out from the terminal end portion of the upstream pipe-like member to the interior of the downstream pipe-like member. Thus, the ejector effect at the gap becomes even stronger. Accordingly, more of the cooling air can be pulled into the exhaust passage, and thus the exhaust gas passing through the exhaust passage can be even more efficiently cooled.

The work vehicle of the above configuration is preferably configured as described below. In the portion connecting the pipe-like members with each other, which is positioned at the third passage, the terminal end portion of the upstream pipe-like member is connected to the introductory end portion of the next downstream pipe-like member in a state where a gap exists in the diameter direction.

According to the above configuration, in the portion connecting the pipe-like members with each other, which is positioned at the third passage, the cooling air supplied to the area around the connecting portion is sucked into the gap by the ejector effect generated by the exhaust gas flowing out from the terminal end portion of the upstream pipe-like member to the interior of the downstream pipe-like member. The cooling air then flows into the interior of the downstream pipe-like member. In other words, the cooling air is pulled into the exhaust passage.

As described above, the cooling air is pulled into the exhaust passage due to the ejector effect, thus enabling the temperature of the exhaust gas exhausted from the exhaust passage to be further reduced.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

(Overall Configuration)

Figure 1:
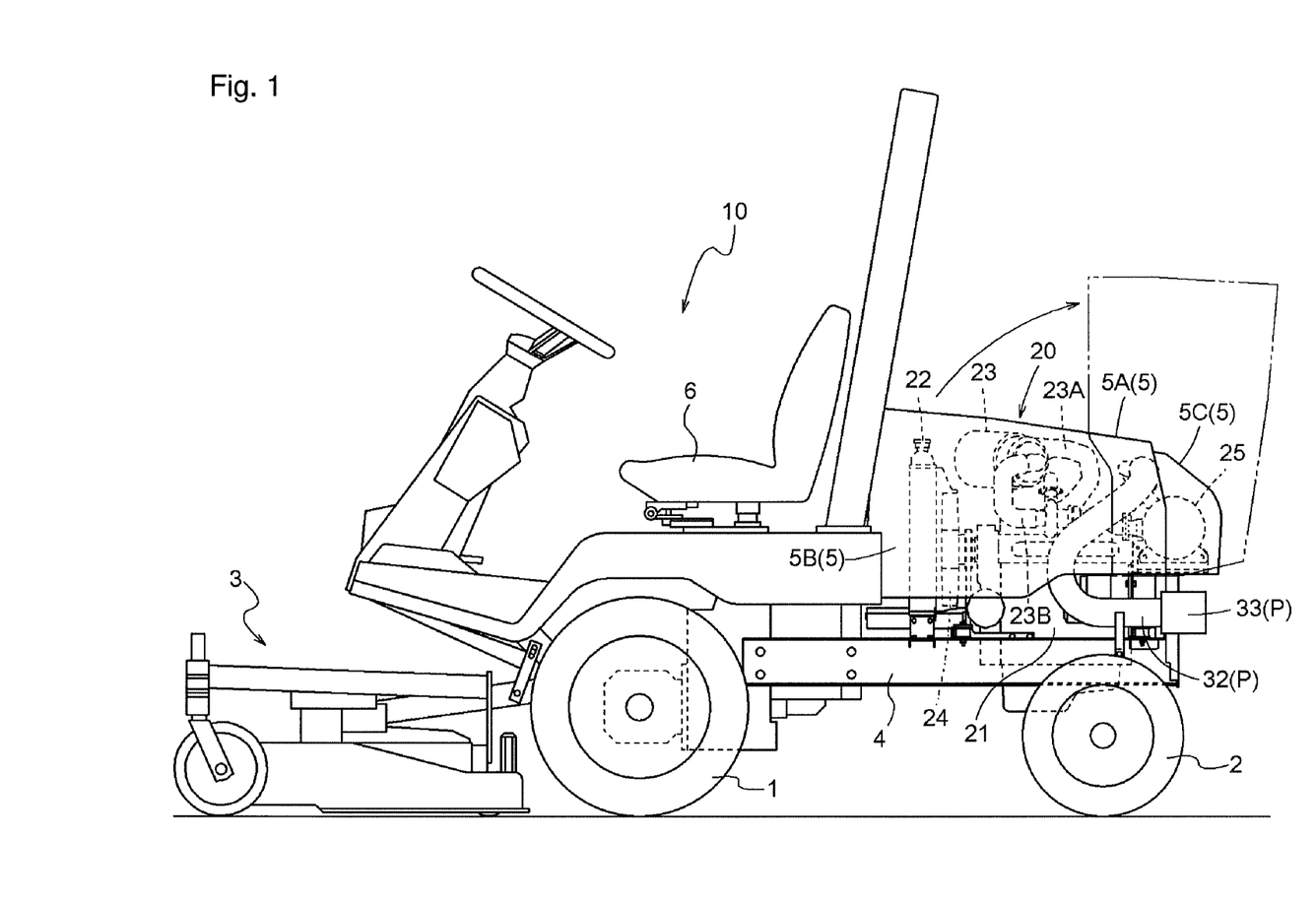
FIG. 1 is an overall left side view of a work vehicle.

A work vehicle embodying the present invention is, for example, a riding-type mower. As shown in FIG. 1, the riding-type mower includes a left-right pair of front wheels 1 supported on a front end of a vehicle body and a left-right pair of rear wheels 2 as steerable drive wheels supported on a rear end of the vehicle body. In addition, a bar blade mower 3 is suspended in front of the vehicle body, supported so as to be liftable and lowerable. Specifically, the riding-type mower of the present embodiment is known as a front mount configuration.

As shown in FIG. 1, a driver section 10 having a driver's seat 6 is provided on a front portion of the vehicle body. A hood 5 is provided on a top side of a left-right pair of rear frames 4 positioned at a rear portion of the vehicle body as part of a vehicle body frame. Under the hood 5, a motor portion 20 is provided having a water-cooled diesel engine (hereafter, simply referred to as an engine 21) mounted on the rear frames 4.

Figure 2:
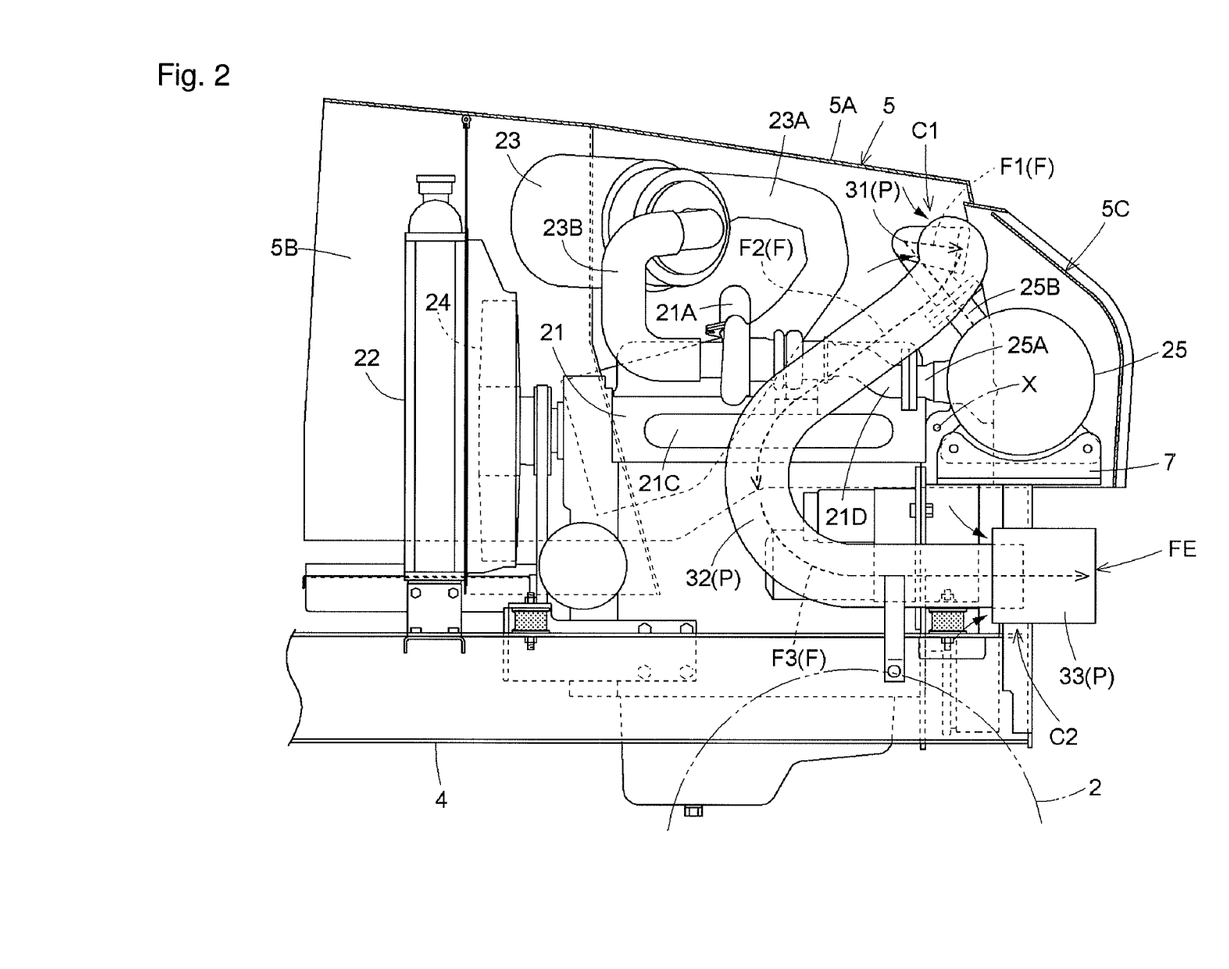
FIG. 2 is a left side view of a motor portion of the work vehicle.
Figure 3:
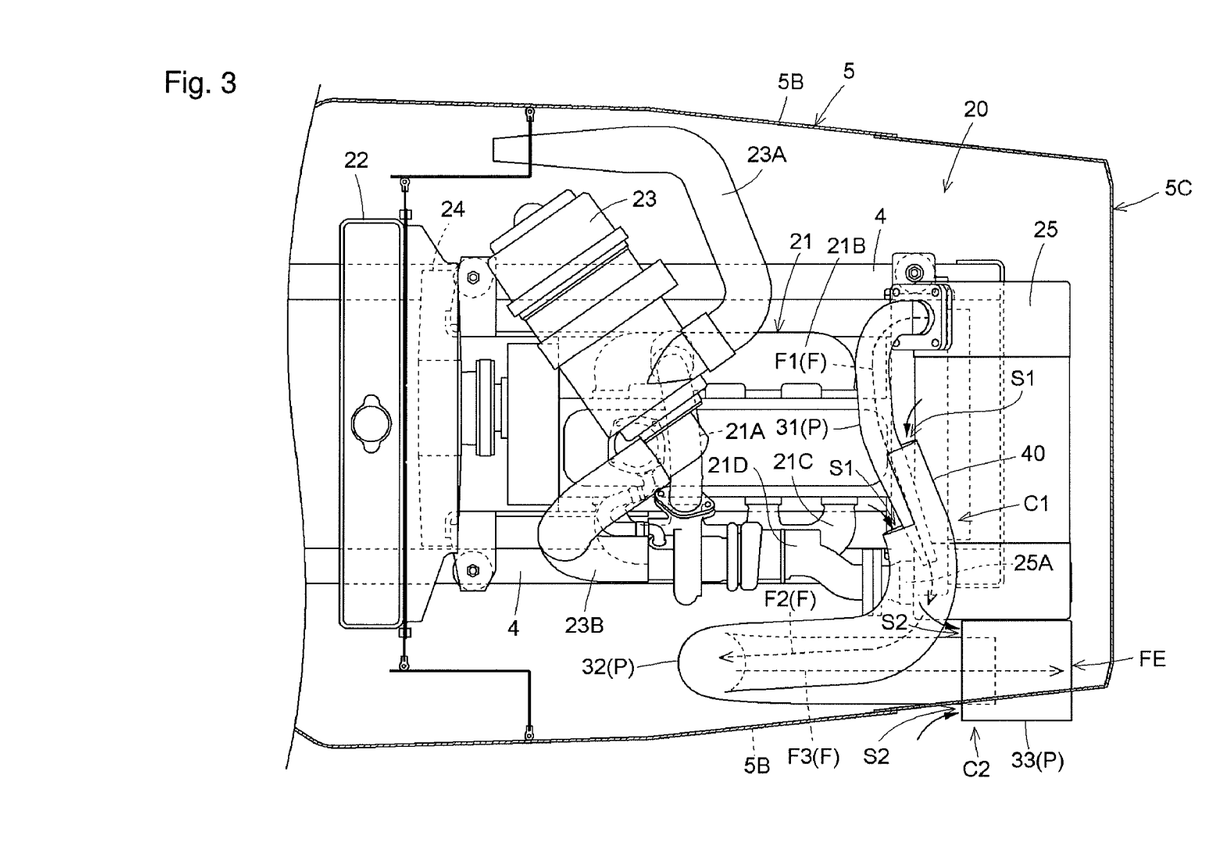
FIG. 3 is a plan view of the motor portion of the work vehicle.

As shown in FIGS. 1 to 3, the hood 5 is configured with a top panel 5A integral with a left-right pair of side panels 5B, and an encasement member 5C positioned to the rear of the top panel 5A and the left-right pair of side panels 5B. The encasement member 5C is configured to include a top surface, a left-right pair of side surfaces, and a rear surface. The top panel 5A and the left and right side panels 5B of the hood 5 are vertically swingable around a rear axis X in a width direction of the vehicle body (see FIG. 2) between a closed position enclosing the motor portion 20 and an open position allowing access to the top of the motor portion 20.

(Configuration of the Motor Portion under the Hood)

As shown in FIGS. 1 to 4, the motor portion 20 includes, in addition to the engine 21, a radiator 22, an air cleaner/filter 23 (hereafter referred to as an air filter 23), a cooling fan 24, and a DPF 25 that purifies exhaust gas originating in the engine 21. Specifically, beginning at the front in a front-back direction of the vehicle body, the radiator 22, the cooling fan 24, the engine 21, and the DPF 25 are placed in that order under the hood 5. The engine 21 is positioned in a so-called longitudinal orientation in which a crank shaft of the engine 21 lies along the front-back direction of the vehicle body. The air filter 23 is disposed above the engine 21, closer to a lateral side than a central portion in the width direction of the vehicle body. The exterior of the air filter 23 has a cylindrical shape.

According to the above-described positioning, spaces are formed between the engine 21 and the left and right side panels 5B of the hood 5. Hereafter, these spaces are also referred to as a "lateral space under the hood 5," where appropriate. A space is also formed between the engine 21 and the top panel 5A of the hood 5. Hereafter, this space is also referred to as an "upper space under the hood 5," where appropriate.

As shown in FIGS. 1 to 3, the cooling fan 24 is disposed between the radiator 22 and the engine 21, positioned such that the cooling fan 24 causes outside air entering from the front of the hood 5 to pass the radiator 22 by being rotation-driven, then supplies the outside air to the rear. According to the above configuration, in a state where the hood 5 is in the closed position, the cooling air from the cooling fan 24 passes between the engine 21 and the hood 5 to the rear. In other words, the cooling air passes to the rear through the space between the engine 21 and the left and right side panels 5B of the hood 5 as well as through the space between the engine 21 and the top panel 5A of the hood 5.

Figure 4:
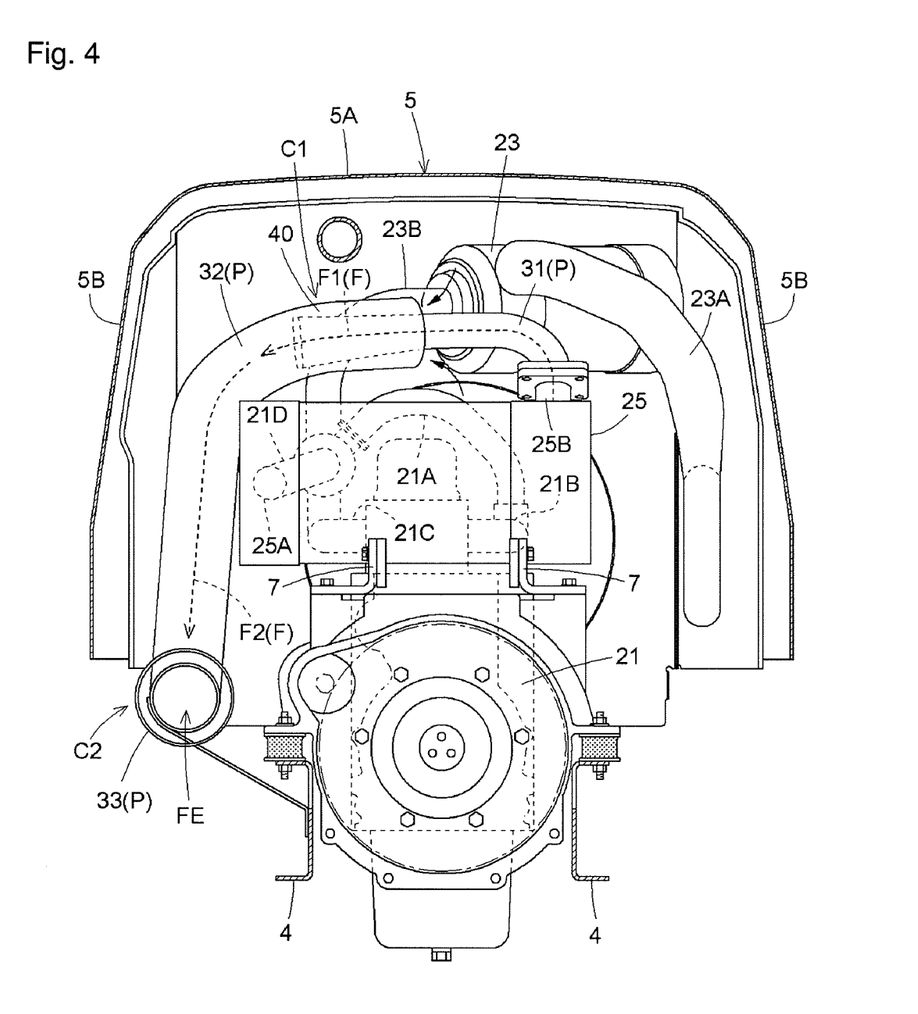
FIG. 4 is a rear view of the motor portion of the work vehicle.

Moreover, some of the cooling air supplied to the "lateral space under the hood 5" escapes from below the hood 5 to the exterior. Specifically, as shown in FIGS. 3 and 4, a portion of the cooling air flows to an exterior portion below the hood 5 through an area further to the rear than the cooling fan 24 and, in the width direction of the vehicle body, further to an outer lateral side than the engine 21 and further to an inner lateral side than the side panels 5B of the hood 5. Hereafter, this area is also referred to as an "under-hood-5 exterior lateral area," where appropriate.

As shown in FIGS. 1 to 4, an outside air intake tube 23A pulls outside air into the air filter 23. The outside air intake tube 23A extends toward an outer lateral side of the vehicle body from one end portion of the air filter 23, then extends toward the front of the vehicle body.

As shown in FIGS. 2 to 4, outside air pulled into the outside air intake tube 23A is supplied to the engine 21 as combustion air via a connecting tube 23B, an intake tube 21A of the engine 21, and an intake manifold 21B of the engine 21. The connecting tube 23B extends from the air filter 23 toward the engine 21. The intake tube 21A is connected to and continuous with the connecting tube 23B. The intake manifold 21B is connected to and continuous with the intake tube 21 A and extends from the engine 21.

As shown in FIGS. 2 to 4, an exhaust manifold 21C of the engine 21 extends from the engine 21. An exhaust collection tube 21D of the engine 21 is connected to and continuous with the exhaust manifold 21C.

As shown in FIGS. 1 to 4, an exterior of the DPF 25 has a columnar shape. In addition, the DPF 25 is fixed in position to a DPF support member 7 extending upward from the vehicle body frame (see FIGS. 2 and 4). The length direction of the DPF 25 is fixedly positioned in a transverse state along the width direction of the vehicle body. The DPF 25 is further positioned behind a top portion of the engine 21. Specifically, the DPF 25 is positioned to overlap with the top portion of the engine 21 in a rear view, as shown in FIG. 4. As shown in FIGS. 1 to 3, a portion of the DPF 25 protrudes from a rear end of the top panel 5A and the left-right pair of side panels 5B of the hood 5. The portion of the DPF 25 is covered above, on left and right sides, and behind by the encasement member 8.

As shown in FIGS. 2 to 4, an intake tube 25A of the DPF 25 extends toward the front from a front surface on one end portion of the DPF 25. The intake tube 25A of the DPF 25 is also connected to and continuous with the exhaust collection tube 21D of the engine 21. Specifically, the exhaust gas from the engine 21 flows into the DPF 25 via the exhaust manifold 21C, the exhaust collection tube 21D of the engine 21, and the intake tube 25A of the DPF 25.

(Exhaust Passage)

As shown in FIGS. 2 to 4, after being purified by passing through the DPF 25, the exhaust gas is exhausted to the exterior of the hood 5 by passing through an exhaust passage F extending from the DPF 25. Immediately after flowing into an introductory end portion of the exhaust passage F, the exhaust gas has an extremely high temperature of approximately 600° C. Therefore, so as to not excessively heat an area around an exhaust outlet FE included on a terminal end portion of the exhaust passage F, the temperature of the exhaust gas which has been exhausted from the exhaust outlet FE is preferably reduced to approximately 270° C. A configuration of the exhaust passage F to achieve this is described hereafter.

As shown in FIGS. 2 to 4, the exhaust passage F is configured to include a first passage F1 extending from the DPF 25, a second passage F2 continuous with the first passage F1, and a third passage F3 continuous with the second passage F2 and having the exhaust outlet FE. The first passage F1, the second passage F2, and the third passage F3 are predetermined regions of the exhaust passage F referred to in this way in order to facilitate their description and are not necessarily intended to indicate a limitation on various elements configuring the exhaust passage F.

The first passage F1 includes an introductory end portion of the exhaust passage F. The first passage F1 extends forward and upward from a top portion of a front surface of the other end portion of the DPF 25. Specifically, in the side view of FIG. 2 and the plan view of FIG. 3, the first passage F1 extends forward and upward until reaching a position not located above the DPF 25 (i.e., a position above a rear portion of the engine 21).

As shown in FIGS. 2 to 4, after extending forward and upward as described above, the first passage F1 is extended on a front side of the DPF 25 so as to follow the length direction of the DPF 25. Specifically, a portion of the first passage F1 extending along the length direction is positioned above the engine 21 in a rear view (see FIG. 4). In other words, the portion of the first passage F1 extending along the length direction extends in the width direction of the vehicle body as described above in the "upper space under the hood 5" where the cooling air flows.

As shown in FIGS. 2 and 3, the portion of the first passage F1 extending along the length direction is positioned further to the rear further downstream. Specifically, in the side view of FIG. 2 and the plan view of FIG. 3, the portion of the first passage F1 extending along the length direction is directed to the rear while extending along the length direction of the DPF 25 until reaching a position above a top portion on the front surface of the DPF 25.

As shown in FIGS. 2 to 4, the "second passage F2" is continuous from a downstream portion of the first passage F1 (i.e., a portion of the first passage F1 positioned above the top portion of the front surface of the DPF 25 in side view and plan view) and extends downward. Specifically, the second passage F2 extends downward in the "lateral space under the hood 5" where the cooling air flows.

As shown in FIGS. 2 and 3, the second passage F2 is positioned further forward the lower a portion of the second passage is. Specifically, in the side view of FIG. 2, the second passage F2 overlaps with the engine 21 and is directed forward while extending downward until overlapping with a bottom end portion of the hood 5.

As shown in FIGS. 2 to 4, the third passage F3 is continuous from a downstream portion of the second passage F2 and extends to the rear. Specifically, the third passage F3 extends downward and to the rear from the downstream portion of the second passage F2, then extends to the rear. Specifically, the third passage F3 extends to the rear in the "under-hood-5 exterior lateral area" where the cooling air flows.

In the side view of FIG. 2, the third passage F3 extends to the rear until reaching a position below the DPF 25. The exhaust outlet FE of the exhaust passage F is provided on the terminal end portion of the third passage F3 with a rear exhaust configuration. The exhaust outlet FE may also be provided with a side exhaust configuration, exhausting the exhaust gas along the width direction of the vehicle body.

The exhaust passage F (which includes the first passage F1, the second passage F2, and the third passage F3 as described above) is formed by connecting an exhaust tube 25B of the DPF 25 extending from the DPF 25 with a plurality of pipe-like members P. The plurality of pipe-like members P have a larger diameter further downstream.

In the present embodiment, as shown in FIGS. 2 to 4, three pipe-like members including a first pipe-like member 31, a second pipe-like member 32, and a third pipe-like member 33 correspond to the plurality of pipe-like members P. Each of the pipe-like members 31, 32, and 33 is positioned in that order downstream on the exhaust passage F. Specifically, the diameter of each of the pipe-like members 31, 32, and 33 is larger in that order. The exhaust tube 25B of the DPF 25 and the first pipe-like member 31 have substantially the same diameter.

As shown in FIGS. 2 and 4, a portion from an introductory end portion of a portion on the first passage F1 extending upward and forward to a middle portion of the first passage F1 is formed by the exhaust tube 25B of the DPF 25.

As shown in FIGS. 2 to 4, an introductory end portion of the first pipe-like member 31 is connected to and continuous with a terminal end portion of the exhaust tube 25B of the DPF 25. Specifically, a portion from middle portion of the portion on the first passage F1 extending upward and forward to a middle portion of the portion on the first passage F1 extending along the length direction is formed by the first pipe-like member 31.

As shown in FIGS. 2 to 4, an introductory end portion of the second pipe-like member 32, which is supported by a supporting member (not shown in the drawings) extending from the vehicle body side, is connected to a terminal end portion of the first passage F1. Specifically, a portion from the middle portion of the portion on the first passage F1 extending along the length direction to a middle portion on the third passage F3 is formed by the second pipe-like member 32. Hereafter, the portion connecting the terminal end portion of the first pipe-like member 31 and the introductory end portion of the second pipe-like member 32 is referred to as a first connecting portion C1. As shown in FIGS. 3 and 4, the first connecting portion C1 is positioned in a middle portion of the portion on the first passage F1 extending along the length direction. The first connecting portion C1 is set in a position not overlapping with the air filter 23 in the front-back direction of the vehicle body.

As shown in FIGS. 2 to 4, an introductory end portion of the third pipe-like member 33, which is supported by a supporting member (not shown in the drawings) extending from the vehicle body side, is connected to a terminal end portion of the second pipe-like member 32. Specifically, a portion from the middle portion of the third passage F3 to the terminal end portion of the third passage F3 is formed by the third pipe-like member 33. In addition, the terminal end portion of the third pipe-like member 33 corresponds to the exhaust outlet FE of the exhaust passage F provided to the third passage F3. Hereafter, the portion connecting the terminal end portion of the second pipe-like member 32 and the introductory end portion of the third pipe-like member 33 is referred to as a second connecting portion C2.

As shown in FIG. 3, in the first connecting portion C1, the terminal end portion of the first pipe-like member 31, which is the pipe-like member P on the upstream side, is inserted into the introductory end portion of the second pipe-like member 32, which is the pipe-like member P next downstream, in a state where a gap (hereafter referred to as a first gap S1) exists in a diameter direction.

In other words, in the first connecting portion C1, the first gap S1 opens facing the upstream side of the first passage F1. Accordingly, due to an ejector effect generated by the exhaust gas flowing out from the terminal end portion of the first pipe-like member 31 to an interior of the second pipe-like member 32, the cooling air supplied to an area around the first connecting portion C1 is pulled into the first gap S1 and flows into an interior of the second pipe-like member 32. Specifically, the cooling air is pulled into the exhaust passage F.

As shown in FIGS. 2 to 4, the terminal end portion of the first pipe-like member 31 (which is the pipe-like member P on the upstream side at the first connecting portion C1) has a passage with a cross-sectional surface area smaller than the cross-sectional surface area of the passage further upstream. Therefore, the speed of the exhaust gas flowing out from the terminal end portion of the first pipe-like member 31 is faster than the speed of the exhaust gas on a side further upstream. Accordingly, the exhaust gas can be made to flow energetically out from the terminal end portion of the first pipe-like member 31 to the interior of the second pipe-like member 32. Thus, the ejector effect at the first gap S1 grows even stronger and, accordingly, more of the cooling air is pulled into the second pipe-like member 32.

As shown in FIGS. 3 and 4, the first connecting portion C1 includes a plate member 40 guiding the cooling air to the first gap S1. Specifically, the plate member 40 forms a curve along a rear portion in the circumferential direction of the introductory end portion of the second pipe-like member 32. The plate member 40 causes the inner surface on the rear side of the first pipe-like member 31 to face a stream of the cooling air. The plate member 40 extends along the first passage F1 from the rear portion along the circumferential direction of the introductory end portion of the second pipe-like member 32.

According to the above configuration, by contacting the inner surface of the plate member 40, the direction of the cooling air supplied to the rear from the cooling fan 24 is changed to be directed downstream of the first passage F1 while following the inner surface of the plate member 40. Specifically, by guiding the cooling air to the first gap 51 with the plate member 40, the cooling air is made to flow into the second pipe-like member 32 and thus is pulled into the exhaust passage F.

In the present embodiment described above, as shown in FIGS. 2 and 3, the portion of the first passage F1 extending along the length direction is directed to the rear while extending along the length direction of the DPF 25. According to the above configuration, the first gap S1 of the first connecting portion C1 positioned at the middle portion of the portion extending along the length direction opens facing the flow of the cooling air. The cooling air is thus pulled into the first gap S1 more easily. In addition, according to the above configuration, the plate member 40 is positioned so as to be further to the rear the further downstream of the first passage F1 a portion is located. The cooling air is thus guided to the first gap S1 by the plate member 40 more easily.

In the present embodiment as described above, as shown in FIGS. 3 and 4, the first connecting portion C1 is in a position not overlapping with the air filter 23 in the front-back direction of the vehicle body. Thereby, the cooling air is supplied to the area around the first connecting portion C1 without being obstructed by the air filter 23. Thus, the cooling air can be more efficiently guided to and pulled into the first gap S1.

As shown in FIGS. 2 to 4, in the second connecting portion C2, the terminal end portion of the second pipe-like member 32, which is the pipe-like member P on the upstream side, is inserted into the introductory end of the third pipe-like member 33, which is the pipe-like member next downstream, in a state where a gap (hereafter, referred to as a second gap S2) exists in the diameter direction. Specifically, at the second connecting portion C2, the second gap S2 opens forward to face the upstream side of the third passage F3.

Accordingly, due to the ejector effect generated by the exhaust gas flowing out of the terminal end portion of the second pipe-like member 32 to an interior of the third pipe-like member 33, the cooling air supplied to an area around the second connecting portion C2 is pulled into the second gap S2 and flows into an interior of the third pipe-like member 33. Specifically, the cooling air is pulled into the exhaust passage F. The second gap S2 opens forward, and thus running air is also able to flow directly into the second gap S2.

Above, the terminal end portion of the second pipe-like member 32 was described as being inserted into the introductory end portion of the third pipe-like member 33. However, in the second connecting portion C2, the terminal end portion of the second pipe-like member 32 may also be set to have the same position in the front-back direction of the vehicle body, in a state where the second gap S2 in the diameter direction exists with respect to the introductory end portion of the third pipe-like member 33.

By configuring the exhaust passage F as described above, the temperature of the exhaust gas which has been exhausted from the exhaust outlet FE can be reduced to approximately 270° C.

(Alternate Examples)

(1) In the present embodiment, the first pipe-like member 31, the second pipe-like member 32, and the third pipe-like member 33 are the plurality of pipe-like members P. However, the number of the plurality of pipe-like members P is not limited to the above description. Even in a case where the number of the plurality of pipe-like members is not three, at portions connecting the pipe-like members P with each other, a terminal end portion of the pipe-like member P on the upstream side is preferably connected to the introductory end portion of the pipe-like member P next downstream in a state where a gap exists in a diameter direction. Even in a case where the number of the plurality of pipe-like members P is not three, a configuration corresponding to the first connecting portion C1 and the second connecting portion C2 of the present embodiment, as well as a configuration corresponding to the configuration according to the first connecting portion C1 (the plate member 40, the cross-sectional surface area of a passage for the terminal end portion of the upstream pipe-like member P, and the like) are preferably applied.

(2) In the present embodiment, the third passage F3 extends to the rear in the "under-hood-5 exterior lateral area" as described above. Specifically, the third passage F3 is exposed from the hood 5. Meanwhile, as an alternate example, a cover member (not shown in the drawings) may be attached to a bottom portion of the side panels 5B of the hood 5 so as to extend downward and cover a lateral exterior side of the third passage F3. Thereby, the cooling air from the cooling fan 24 is directed to the rear along the cover member and thus the cooling air is supplied to the area around the third passage F3 more easily.

(3) In the present embodiment, the engine 21 is a water-cooled diesel engine. However, the engine 21 may be another type of engine, as well.

(4) The riding-type mower of the present embodiment has a front mount configuration which includes the mower 3 on the front of the vehicle body. However, the riding-type mower may also have a mid-mount configuration in which the mower 3 is located between the front wheels 1 and the rear wheels 2.

(5) In the present embodiment, the riding-type mower was offered as an example of the work vehicle to which the present invention is applied. However, the present invention may also be applied to other work vehicles which include an exhaust passage extending from the DPF.

The present invention can be applied to a work vehicle having a configuration where the exhaust gas from the engine is exhausted through the exhaust passage extending from the DPF after passing through the DPF.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A work vehicle comprising, at a rear portion of a vehicle body, a cooling fan, an engine, and a diesel particulate filter which purifies exhaust gas from the engine, the work vehicle being configured such that the exhaust gas from the engine is exhausted through an exhaust passage extending from the diesel particulate filter after passing through the diesel particulate filter, wherein the cooling fan, the engine, and the diesel particulate filter are placed in that order from a front direction in a front-rear direction of the vehicle body, the cooling fan is placed so as to supply cooling air to the rear while the diesel particulate filter is placed such that a length direction of the diesel particulate filter follows a width direction of the vehicle body, and the exhaust passage comprises:
a first passage extending forward and upward from the diesel particulate filter before extending along the length direction of the diesel particulate filter on a front side of the diesel particulate filter;
a second passage extending downward from a downstream portion of the first passage; and
a third passage extending to the rear from a downstream portion of the second passage and having an exhaust outlet.

2. The work vehicle according to claim 1, wherein a portion extending along a length direction of the first passage is positioned further to the rear in the downstream direction.

3. The work vehicle according to claim 2, wherein the second passage is positioned further forward the lower a portion of the second passage is.

4. The work vehicle according to claim 1, wherein
the exhaust passage comprises a plurality of connected pipe members,
the pipe members have a larger diameter further downstream,
at a portion connecting the pipe members with each other, positioned at a portion extending along the length direction of the first passage, a terminal end portion of an upstream pipe member is inserted into an introductory end portion of a next downstream pipe member in a state where a gap exists in a diameter direction, and
a plate member formed along a rear portion in a circumferential direction of the introductory end portion is provided to a rear side of the upstream pipe member, extending along the first passage from the rear portion in the circumferential direction of the introductory end portion.

5. The work vehicle according to claim 4, wherein a cross-sectional surface area of the passage at the terminal end portion of the upstream pipe member is smaller than the cross-sectional surface area of the passage further upstream.

6. The work vehicle according to claim 4, wherein at a portion connecting the pipe members with each other, positioned at the third passage, a terminal end portion of an upstream pipe member is connected to an introductory end portion of the next downstream pipe member in a state where a gap exists in the diameter direction.

7. A work vehicle comprising, under a hood provided to a vehicle body, a cooling fan, an engine, and a diesel particulate filter which purifies exhaust gas from the engine,
the work vehicle being configured such that the exhaust gas from the engine is exhausted through an exhaust passage extending from the diesel particulate filter after passing through the diesel particulate filter, wherein
the cooling fan is placed so as to supply cooling air to the engine, and the exhaust passage comprises:
a first passage extending toward the cooling fan and upward from the diesel particulate filter before extending above the engine on the cooling fan side from the diesel particulate filter and along the underside of the hood;
a second passage extending to a lateral side of the engine from a downstream portion of the first passage and downward along the underside of the hood; and
a third passage extending in a direction opposite to the cooling fan with respect to the diesel particulate filter from a downstream portion of the second passage and having an exhaust outlet.

8. A work vehicle comprising, under a hood provided to a vehicle body, a cooling fan, an engine, and a diesel particulate filter purifying exhaust gas from the engine,
the work vehicle configured such that the exhaust gas from the engine is exhausted through an exhaust passage extending from the diesel particulate filter after passing through the diesel particulate filter, wherein
the cooling fan is placed so as to supply cooling air to the engine,
the exhaust passage comprises a first passage extending toward the cooling fan and upward from the diesel particulate filter before extending above the engine on the cooling fan side from the diesel particulate filter and along the underside of the hood, and
the first passage comprises a first pipe member on an upstream side and a second pipe member arranged in a downstream direction, wherein
at a portion connecting the first pipe member with the second pipe member, a terminal end portion of the first pipe member is inserted into an introductory end portion of the second pipe member such that a gap exists in the diameter direction.

9. The work vehicle according to claim 8, wherein an exhaust outlet of the second pipe member is oriented away from a direction of supplied cooling air from the cooling fan.

10. The work vehicle according to claim 9, wherein the exhaust outlet is arranged below the diesel particulate filter.

11. The work vehicle according to claim 1, wherein the exhaust outlet discharges exhaust gas away from a direction of supplied cooling air from the cooling fan.

12. The work vehicle according to claim 1, wherein the exhaust outlet is arranged below the diesel particulate filter.

13. The work vehicle according to claim 1, wherein the exhaust outlet is arranged below and behind the diesel particulate filter.

14. The work vehicle according to claim 7, wherein the exhaust outlet discharges exhaust gas away from a direction of supplied cooling air from the cooling fan.

15. The work vehicle according to claim 7, wherein the exhaust outlet is arranged below the diesel particulate filter.

16. The work vehicle according to claim 7, wherein the exhaust outlet is arranged below and behind the diesel particulate filter.

* * * * *